US012651443B2

(12) United States Patent
Zimmermann et al.

(10) Patent No.: US 12,651,443 B2
(45) Date of Patent: Jun. 9, 2026

(54) METHOD AND DEVICE FOR VALIDATING ANNOTATIONS OF OBJECTS

(71) Applicant: Aptiv Technologies AG, Schaffhausen (CH)

(72) Inventors: Urs Zimmermann, Krefeld (DE); Dennis Müller, Moers (DE)

(73) Assignee: Aptiv Technologies AG, Schaffhausen (CH)

( * ) Notice: Subject to any disclaimer, the term of this patent is extended or adjusted under 35 U.S.C. 154(b) by 297 days.

(21) Appl. No.: 18/369,403

(22) Filed: Sep. 18, 2023

(65) Prior Publication Data

US 2024/0078794 A1 Mar. 7, 2024

Related U.S. Application Data

(63) Continuation of application No. PCT/EP2022/057210, filed on Mar. 18, 2022.

(30) Foreign Application Priority Data

Mar. 19, 2021 (EP) .................................... 21163747

(51) Int. Cl.
*G06V 10/776* (2022.01)
*G01S 7/48* (2006.01)
(Continued)

(52) U.S. Cl.
CPC .......... *G06V 10/776* (2022.01); *G01S 7/4802* (2013.01); *G01S 17/42* (2013.01);
(Continued)

(58) Field of Classification Search
CPC .... G06V 10/776; G06V 10/764; G06V 10/98; G06V 20/70; G06V 20/56; G01S 7/4802;
(Continued)

(56) References Cited

U.S. PATENT DOCUMENTS

2018/0136332 A1 5/2018 Barfield, Jr. et al.
2022/0188554 A1* 6/2022 Huang .................. G01S 13/931

FOREIGN PATENT DOCUMENTS

EP 3772704 A1 2/2021

OTHER PUBLICATIONS

Iterative Bounding Box, Adhikari et al 2020 (Year: 2020).*
European Search Report regarding European Patent Application No. 21163747.5-1207, dated Sep. 22, 2021.
(Continued)

*Primary Examiner* — Jianxun Yang
(74) *Attorney, Agent, or Firm* — Harness, Dickey & Pierce, P.L.C.

(57) ABSTRACT

A method is provided for validating annotations of objects. Spatial datapoints acquired by a sensor and annotation data are received. The annotation data is associated with the acquired spatial data points and includes an identification of each respective object. Via a processing unit, the annotations of the objects are validated by performing the steps of: determining a target range for at least one property of the objects, determining, from the acquired spatial datapoints and/or from the annotation data, a respective value of the at least one property for each respective object, and for each object, identifying the object as an erroneous object if the respective value of the at least one property is outside the target range for the at least one property. The erroneous object is selected for review regarding erroneous annotation.

15 Claims, 4 Drawing Sheets

Figure 1:
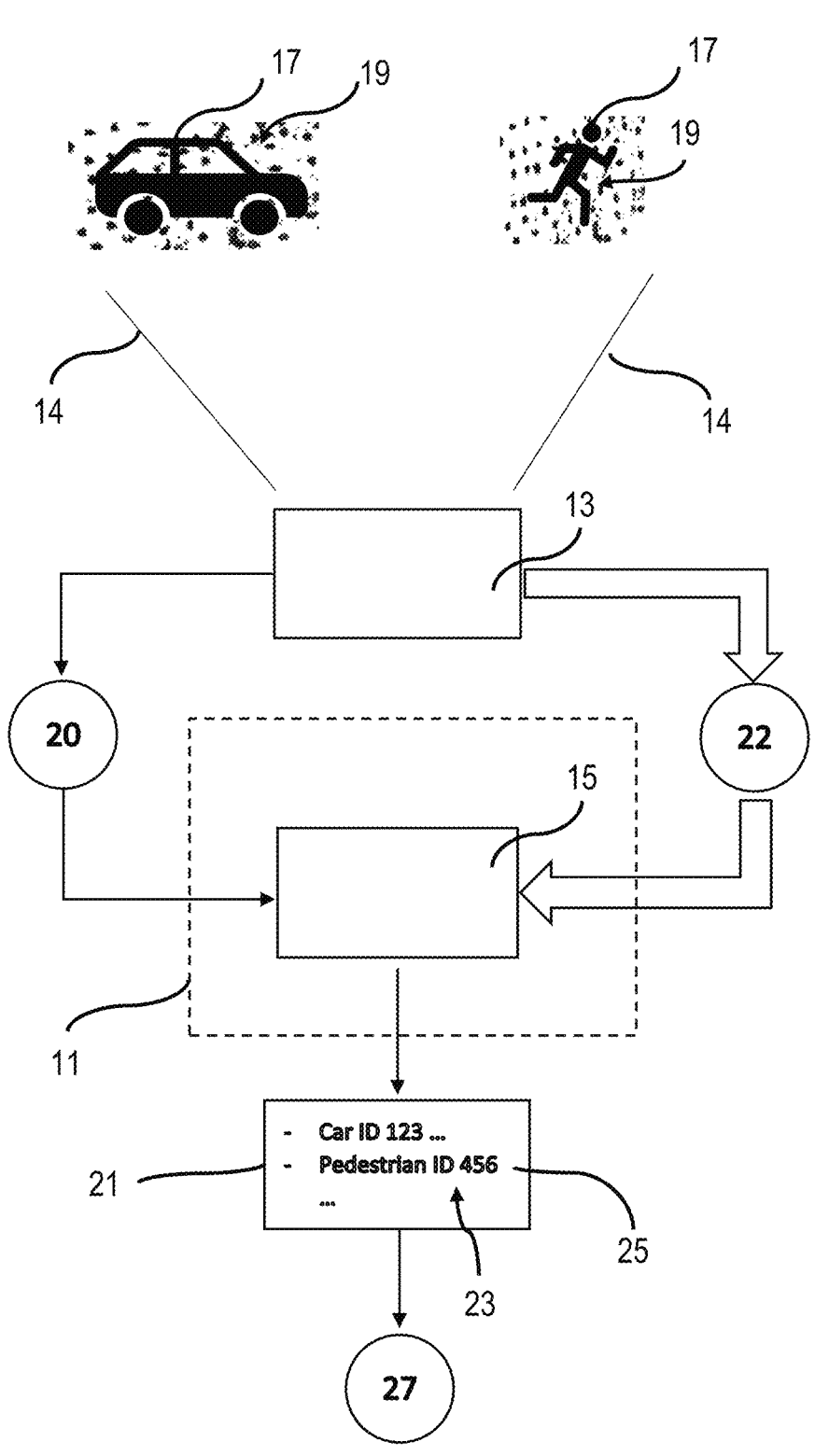

(51) Int. Cl.

| | |
|---|---|
| *G01S 17/42* | (2006.01) |
| *G01S 17/58* | (2006.01) |
| *G01S 17/931* | (2020.01) |
| *G06T 7/246* | (2017.01) |
| *G06T 7/73* | (2017.01) |
| *G06V 10/764* | (2022.01) |
| *G06V 10/98* | (2022.01) |
| *G06V 20/70* | (2022.01) |

(52) U.S. Cl.
CPC ............ *G01S 17/58* (2013.01); *G01S 17/931* (2020.01); *G06T 7/246* (2017.01); *G06T 7/73* (2017.01); *G06V 10/764* (2022.01); *G06V 10/98* (2022.01); *G06V 20/70* (2022.01); *G06T 2207/10028* (2013.01)

(58) Field of Classification Search
CPC ........ G01S 17/42; G01S 17/58; G01S 17/931; G06T 7/246; G06T 7/73; G06T 2207/10028; G06F 18/217; G06F 18/2193
See application file for complete search history.

(56) References Cited

OTHER PUBLICATIONS

International Search Report and Written Opinion of the International Searching Authority regarding International Patent Application No. PCT/EP2022/057210, dated Jul. 12, 2022.

"An Efficient Approach for Outlier Detection with Imperfect Data Labels," B. Liu, et al., IEEE Transactions on Knowledge and Data Engineering, vol. 26, No. 7, Jul. 2014.

"Crowdsourced Interactive Computer Vision," M.E. Schwarzer-Becker, Dissertation submitted to the Combined Faculties for the Natural Sciences and for Mathematics of the Ruperto-Carola University of Heidelberg, Germany for the degree of Doctor of Natural Sciences, Oct. 19, 2016.

"Clickstream analysis for crowd-based object segmentation with confidence," E. Heim et al., IEEE Transactions on Pattern Analysis and Machine Intelligence, DOI: 10.1109/TPAMI.2017.2777967, dated Nov. 25, 2016.

International Preliminary Report on Patentability regarding International Patent Application No. PCT/EP2022/057210 dated Sep. 28, 2023.

* cited by examiner

METHOD AND DEVICE FOR VALIDATING ANNOTATIONS OF OBJECTS

CROSS-REFERENCE TO RELATED APPLICATIONS

This application is a Bypass Continuation Application of PCT/EP2022/057210, filed Mar. 18, 2022, which claims priority to European Patent Application No. 21163747.5, filed Mar. 19, 2021. The entire disclosures of each of the above applications are incorporated herein by reference.

FIELD

The present disclosure relates to a method and a device for validating annotations of objects identified based on a plurality of spatial datapoints, wherein the annotations include a respective classification and spatial location of the objects.

BACKGROUND

For driver assistance systems and for autonomous driving of vehicles, a reliable perception of the environment of the vehicles is essential. For the perception of the environment, a Lidar sensor is nowadays an important component, e.g. for recognizing objects in the environment of the vehicles. The Lidar sensor usually provides a so-called point cloud including three-dimensional spatial datapoints in a coordinate system related to the vehicle or to the Lidar sensor.

In addition to a direct analysis of such a point cloud provided by the Lidar sensor, the datapoints from the point cloud often provide a basis for many machine learning algorithms, e.g. by providing the ground truth for a learning procedure of a neural network. The datapoints provided by the Lidar sensor may also provide the ground truth for other sensors, such as Radar systems.

For generating the ground truth for machine learning, for example, the datapoints from the Lidar sensor have to be annotated. That is, objects are identified within the Lidar point cloud, e.g. manually or by some pattern recognition system, the identified objects are classified, e.g. as passenger car, pedestrian etc., and the spatial location of the respective object is described, e.g. by enclosing the identified objects via a geometrical shape like a cuboid.

In order to provide a reliable data basis e.g. for machine learning, the annotated objects need to be reviewed. That is, it has to be checked e.g. whether the objects are correctly classified, whether cuboids enclosing an object are placed in a correct manner, whether the respective object is tightly and completely covered by the respective cuboid, whether the orientation of the cuboid is correct (roll, pitch and yaw angle with respect to the coordinate system of the Lidar sensor or the vehicle), etc. Usually, such a review of annotated objects derived from a Lidar point cloud is performed manually. Such a manual review is a time-consuming task since it is necessary to verify the correctness of a cuboid enclosing an object from various perspectives in a three-dimensional space. Therefore, verifying objects derived from a Lidar point cloud usually needs much more time than e.g. reviewing two-dimensional bounding boxes.

In addition, the tedious process of manual reviewing the objects or cuboids related to a three-dimensional Lidar point cloud may be error-prone. For example, wrongly annotated cuboids can easily be overlooked and therefore not being reviewed with high quality since the concentration and motivation of the reviewer may decrease during the manual review process.

Accordingly, there is a need for a method and a device which are able to validate annotations of objects and to identify erroneously annotated objects automatically.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for validating annotations of objects. According to the method, a plurality of spatial datapoints acquired by a sensor is received, the spatial datapoints being related to the external environment of the sensor, and annotation data of objects is received, the annotation data being associated with the acquired spatial data points and including an identification of each respective object. Via a processing unit, the annotations of the objects are validated by performing the steps of: determining a target range for at least one property of the objects, determining, from the acquired spatial datapoints and/or from the annotation data, a respective value of the at least one property for each respective object, and for each object, identifying the object as an erroneous object if the respective value of the at least one property is outside the target range for the at least one property, the erroneous object being selected for review regarding erroneous annotation.

The sensor may be a Lidar system, for example, and the spatial datapoints may be defined in a three-dimensional coordinate system having its origin at the sensor, e.g. at the Lidar system. That is, the plurality of spatial datapoints may be also regarded as a Lidar point cloud.

The sensor may be installed in a vehicle. The three-dimensional coordinate system in which the spatial datapoints are defined may therefore alternatively be a vehicle coordinate system.

Annotating objects comprises providing an identification or specification of the respective object. The identification may include a classification of the respective object, i.e. associating the object with one of a plurality of predefined object classes, e.g. whether the object is a passenger car, a truck, a pedestrian etc. In addition, the identification may include geometrical information of the respective object, e.g. regarding the dimensions and the spatial orientation of the object.

Before the method is able to perform the validation steps for the annotations of the objects, the method needs to receive the spatial datapoints, e.g. a Lidar point cloud, and the annotation data providing the annotations to be validated or assessed for the objects. In other words, the spatial datapoints and the annotation data are a prerequisite for performing the method.

The target range for the at least one property of the objects may be predefined based on expected values for the property, e.g. for a length or a width of a car. Alternatively, as described below, the target range may be determined based on a respective probability distribution which may be derived from a selected portion of the datapoints and sample objects associated with this selected portion.

The objects which are selected for the review regarding erroneous annotation may be presented to a user as a list of objects to be reviewed. Therefore, the method automatically prioritizes the objects which are located in the environment of the sensor and which are annotated in a first step (e.g. manually or by some pattern recognition system), i.e. before performing the method, for a second step of reviewing the annotations. The method performs a validation of the annotation of all objects by indicating the selected objects to be reviewed, e.g. as the list of the objects. Therefore, the reliability of the final annotation is improved since it can be expected that the most severe wrong annotations of objects will be detected.

On the other hand, just a portion or subset of the total number of objects, i.e. the selected objects, have to be reviewed regarding the erroneous annotation. This strongly reduces the effort of the entire annotation process in comparison to a manual review of the annotations of all identified objects.

According to an embodiment, the identification of the respective object may include a classification and a predefined geometrical shape, wherein the predefined geometrical shape is associated with a subset of the acquired spatial datapoints for each respective object. In other words, the identification may include a type of the respective object and its assumed spatial location due to the predefined geometrical shape being associated with those spatial datapoints which are regarded as belonging to the respective object. This may include that the object is enclosed tightly by the geometrical shape, but completely covered such that the datapoints which are assumed to belong to the respective object are located in the interior of the geometrical shape.

The predefined geometrical shape may be a cuboid. The cuboid may enclose the subset of the spatial datapoints belonging to the respective object tightly such that the subset is completely located within the cuboid. The dimensions and the orientation of the respective cuboid may be easily determined which reduces the effort for performing the method. Alternatively, the predefined geometrical shape may be a cylinder or a sphere, for example.

The target range may be determined by performing the steps of: selecting a portion of the spatial datapoints which include a respective subset of the spatial datapoints for each of a plurality of sample objects, determining a respective value of the at least one property for each sample object based on the assigned geometrical shape and/or the respective subset of the spatial datapoints, estimating at least one probability distribution for the property based on a statistical distribution for the values of the property for the sample objects, and deriving the target range for the at least one property of the respective objects from the at least one probability distribution.

The portion of the spatial datapoints which may be selected and used for identifying the sample objects has to be determined in such a manner that a sufficient statistical basis is available for estimating the at least one probability distribution for the property. That is, the number of sample objects and therefore the number of values of the at least one property has to be sufficiently large so that statistical criteria are fulfilled for deriving the probability distribution reliably based on the values of the at least one property. For example, the portion of the spatial datapoints may be selected by taking all datapoints from a certain continuous region within an instrumental field of view of a Lidar system, wherein the size of this region may be adapted until an adequate number of sample objects is included.

Therefore, the method may automatically determine the target range for the at least one property. Since a portion of the datapoints is considered only for estimating the probability distribution and for deriving the target range, this embodiment may require a low computational effort although the target range is adapted to the statistical distribution of the objects regarding the at least one property.

According to an embodiment, the at least one property of the objects (including the sample objects) may include parameters of the spatial location of the objects. For example, these parameters may include length, width and height as well as yaw, pitch and roll angles of the predefined geometrical shape assigned to the spatial datapoints for each object in a coordinate system of the sensor. Generally, the parameters may include the spatial dimensions and the orientation of the respective geometrical shapes related to the objects.

If more than one property of the objects is determined, a property or signature vector may be defined for each object. Each component of this vector may represent a value of the respective property.

By using the parameters of the spatial location of the objects as basis for estimating the probability distribution, the validation of the annotation of the objects may be performed in a straight-forward manner since these parameters may be easily derived from the geometrical shape assigned to the subset of spatial datapoints and therefore to the respective object. Hence, one or more properties of the objects may be determined directly with low computational effort.

The at least one property may also be derived from a spatial distribution of the datapoints of the respective subset with respect to the assigned geometrical shape. Furthermore, the at least one property may include at least one statistical property of the datapoints of the respective subset.

Generally, the method may be flexible regarding the number and kind of properties which may be considered for validating the annotation. According to an embodiment, at least one parameter regarding the size and/or the spatial orientation of an object may be selected, e.g. car length and/or car width. However, the reliability of validating the annotations may be enhanced by considering further parameter regarding the spatial location. For example, the six parameters mentioned above for the spatial location of the respective object may be considered, length, width and height as well as yaw, pitch and roll angles. In addition or as an alternative to the parameters related to the spatial location of the object or of the assigned geometrical shape, a relationship of the subset of the spatial datapoints and the respective geometrical shape may be considered.

For example, the spatial datapoints belonging to the respective subset may be transformed into a coordinate system which is defined with respect to the corresponding geometrical shape. As an example for the statistical properties of the spatial datapoints belonging to the respective subset, a mean position or a center of mass of the datapoints and second order moments (covariant matrix) may be determined. By this means, it may be analyzed e.g. whether the respective geometrical shape is fitting tightly to the object to be annotated by examining whether most of the datapoints belonging to the subset are "clustered" close to the surfaces of the geometrical shape. Conversely, if the mean of the datapoints is close to the cuboid center, the respective object may be most probably annotated wrongly. Furthermore, a wrong classification of an object may be identified based on outliers in the elements of the covariant matrix.

According to a further embodiment, a probability value may be determined for the value of the at least one property based on at least one probability distribution, and the respective value of the at least one property may be outside the target range if the probability value is smaller than a predetermined threshold. In other words, an object may be selected for the review if its determined property value is assigned a low probability value, and therefore it may be quite unlikely that the annotation of this object is correct. Conversely, for the objects which are not selected for the review it may be quite unlikely that their annotations are erroneous. Hence, the validation of the annotation may be performed with high quality for this embodiment.

If more than one property is considered for the selection of the objects, each property may be assigned at least one probability distribution separately. In this case, an object may be selected for the review if at least one of the assigned probability values is smaller than the predetermined threshold.

According to a further embodiment, a percentage share of the total number of objects may be predefined for the review regarding erroneous annotation, and one respective object having the lowest probability value may be iteratively selected for the review until the number of selected objects is equal to the predefined percentage share of the total number of objects. In other words, the object having the "least likely" annotation may be selected iteratively for the review, wherein the respective object may not be considered for the next iteration once it is selected. The percentage share may be a fixed number such that e.g. the 20% "least likely" annotations may be identified.

Hence, for this embodiment the effort and/or time for selecting objects for the review may be restricted, and the time for performing the method may generally be limited by this means. However, it may not be ensured for this embodiment that the most severe erroneous annotations will be identified.

The plurality of spatial datapoints may be based on a sequence of Lidar scans for a predetermined time period. Furthermore, the at least one property may include a respective velocity of the objects with respect to the sensor, and the respective velocity may be determined based on the sequence of Lidar scans. For this embodiment, the movement of the objects is also considered when determining the at least one property, i.e. alternatively or additionally to the static properties like the dimensions and the orientation of the respective objects. Considering the movement of the objects may improve the reliability of identifying and selecting wrongly annotated objects. For example, the velocity of a pedestrian is usually lower than the velocity of a passenger car. Therefore, wrongly annotated pedestrians may be easily recognized if their velocity is too high which may be reflected by the method in a low probability value for the velocity of a wrongly annotated pedestrian.

According to a further embodiment, the classification of the respective objects may comprise that the respective object is associated with one of a plurality of object classes, and estimating the at least one probability distribution for the at least one property may comprise estimating a separate probability distribution for each of the plurality of object classes. The different object classes may include, for example, pedestrians, passenger cars, trucks etc. For each of such object classes, it may be expected that their properties are "clustered" in a certain range of the respective property. For example, the values for the height of pedestrians may be expected to be in a range from e.g. 1.6 m to 2.0 m. Similarly, the length and the width of passenger cars may be "clustered" in certain ranges. Due to the separate estimation of the respective probability distribution for each object class, the estimation of the respective probability distribution may be simplified which may improve the reliability of the estimated probability distributions as well.

Each probability distribution may be based on a Gaussian mixture model. The Gaussian mixture model is a probabilistic model which assumes that the respective datapoints are generated from a mixture of a finite number of Gaussian distributions with unknown parameters, i.e. respective centers or mean values and standard deviations. Generally, it may not be expected that the probability distribution (e.g. for an object class like passenger cars) may be properly described by a single Gaussian distribution including one mean value only. Instead, a multimodal distribution may be expected. For example, the statistical distribution for lengths of passenger cars may have more than one maximum since there are usually different categories of passenger cars (small cars, sedans, wagons, etc.) having similar lengths in different ranges. Hence, the Gaussian mixture model may improve the reliability of the probability distribution.

The Gaussian mixture model may include a plurality of Gaussians distributions for each of which a center may be determined based on a median of the determined values of the at least one property for the respective object class, whereas a standard deviation may be determined based on a median of the absolute deviation for the determined values of the at least one property for the respective object class. The respective median may be a robust estimate for the center of the respective Gaussian distribution. Since the determined values of the at least one property may be expected to have outliers, the use of the median may prevent that such outliers may disturb the estimation of the respective probability distributions. A similarly robust estimate for standard deviations may be the median of the absolute deviation (MAD).

According to another embodiment, a potential annotation error may be indicated for the objects being selected for the review. For example, a value of the at least one property may be indicated or assessed (e.g. as being too large or too small) which is expected to cause the erroneous annotation. For this embodiment, the method does not only provide e.g. a list of objects to be reviewed regarding erroneous annotation, but it additionally provides a clear indication of the aspect of the annotation which may be erroneous. When the review of the selected objects is performed manually or automatically, the reason for an erroneous annotation may be easily found by analyzing the indicated potential error related to the respective property. Hence, the time for reviewing the selected objects may be reduced by indicating the assumed annotation error of the selected objects, and the reliability of the review and the final annotation may be improved.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

According to an embodiment, the sensor may include a Lidar system. Since a Lidar system is able to provide a dense point cloud, it may be ensured for this embodiment that the number of available spatial datapoints is large enough in order to provide a sufficient data basis for reliably performing the validation of the annotations of the objects.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
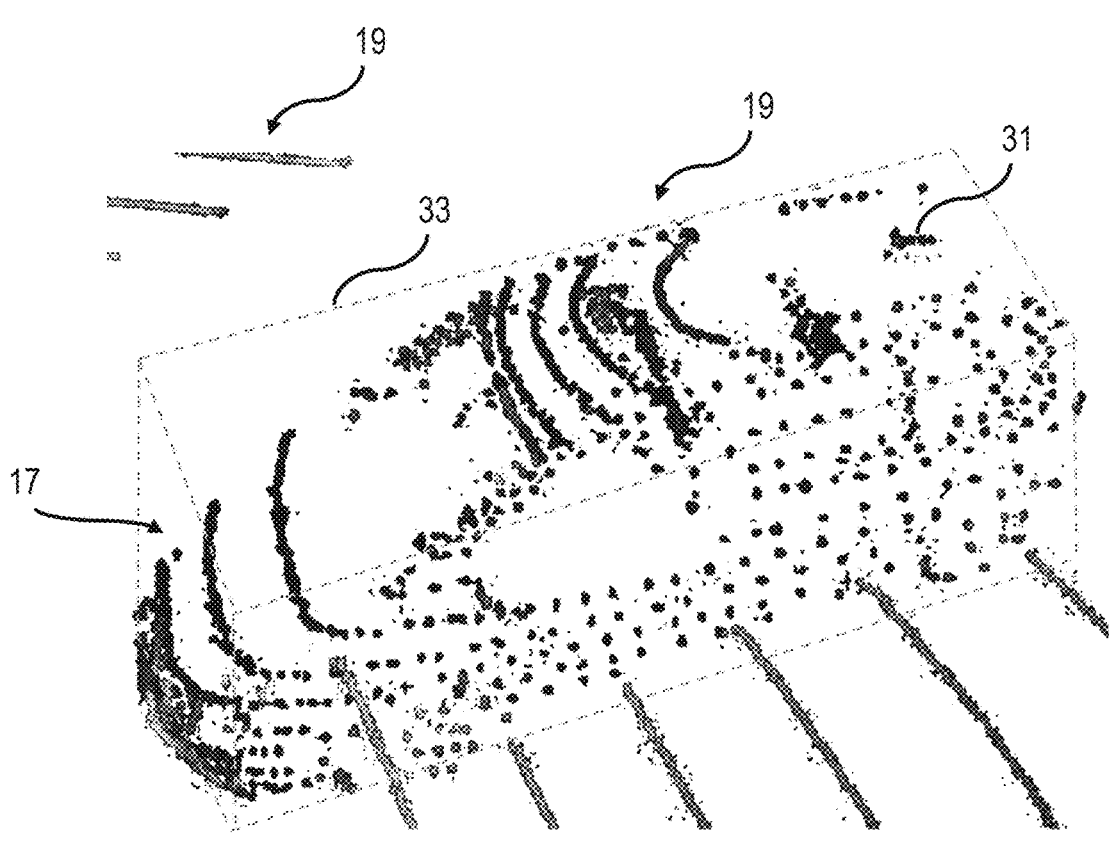
Figure 3A:
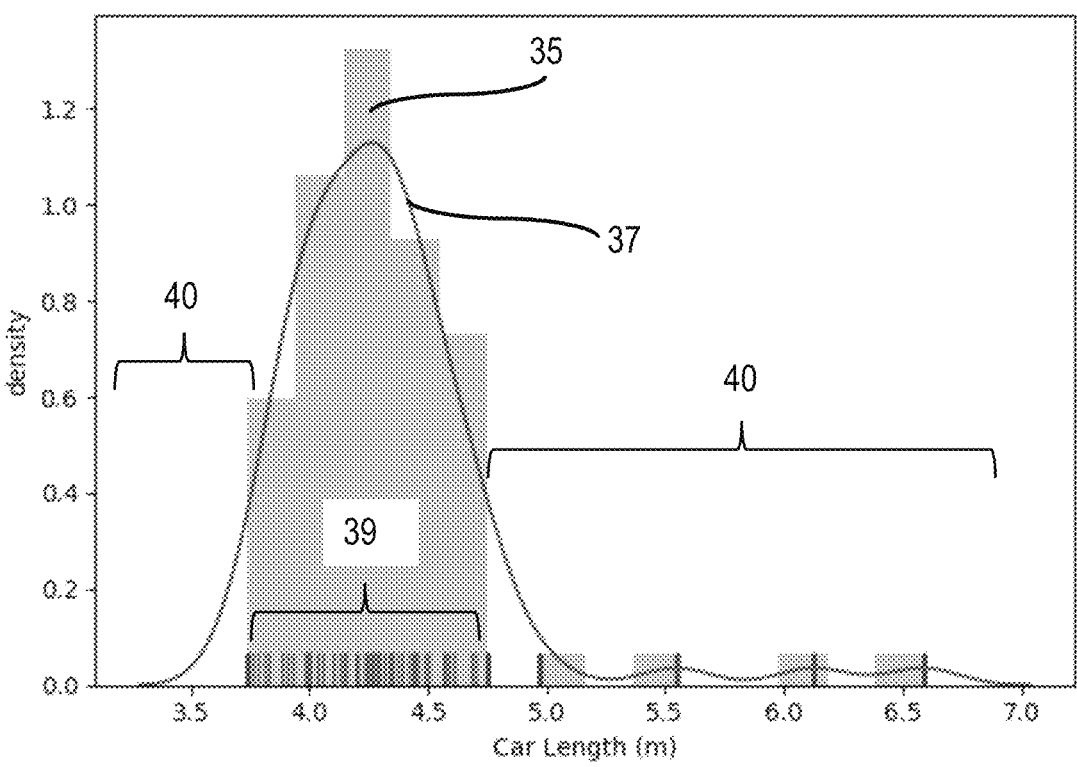
Figure 3B:
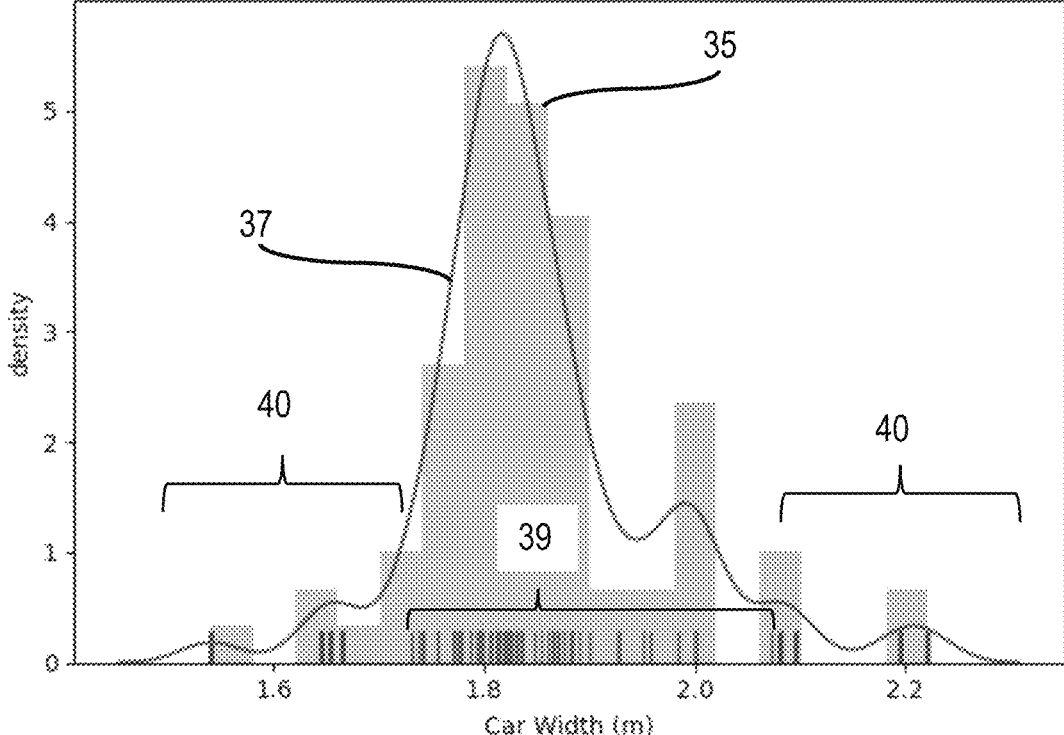
Figure 4:
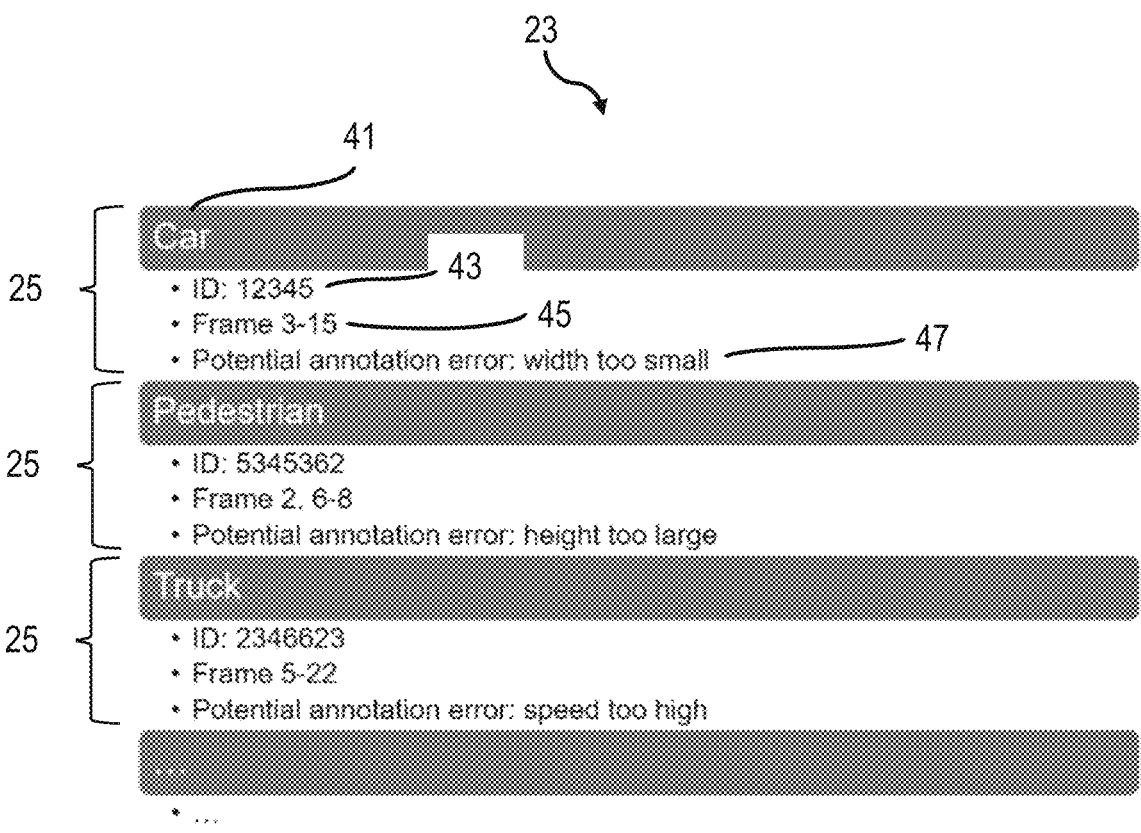

Exemplary embodiments and functions of the present disclosure are described herein in conjunction with the following drawings, showing schematically:

FIG. 1 depicts a device and method steps for validating annotations of objects according to the disclosure, FIG. 2 depicts an example for annotating an object by assigning a cuboid to datapoints, FIGS. 3A and 3B depict examples for statistical distributions and probability distributions used by the device and the method according to the disclosure, and FIG. 4 depicts an example for output information provided by the device and the method according to the disclosure.

DETAILED DESCRIPTION

FIG. 1 depicts a schematic overview of a computer system 11 which is communicatively connected to a sensor 13 in the form of a Lidar system and which includes a processing unit 15 configured to analyze the data provided by the Lidar system 13. The instrumental field of view of the Lidar system 13 is schematically indicated by the lines 14.

The Lidar system 13 is installed in a host vehicle (not shown) such that the Lidar system 13 is provided for monitoring the environment of the host vehicle. The environment of the host vehicle usually includes many objects 17. As examples for the objects 17, a passenger car and a pedestrian are shown. For driver assistance systems and/or autonomous driving of the host vehicle, it is essential to have a reliable perception of the environment of the host vehicle, i.e. especially regarding the location and the movement of the respective object 17.

As is known in the art, the Lidar system 13 provides a plurality of spatial datapoints 19 which cover the respective object 17. The spatial datapoints 19 are three-dimensional datapoints defined in a coordinate system having its origin at the Lidar system 13, for example.

The spatial datapoints 19 are used for annotating the objects 17 from the environment of the host vehicle. The annotation includes an identification of the respective object 17 regarding the object type, i.e. a classification of the respective object 17, and regarding geometrical information, i.e. the size and spatial orientation of the respective object 17.

An example for such an annotation is shown in FIG. 2 which depicts a part of the datapoints 19 acquired by the Lidar system 13 in front of the host vehicle. Due to the high density of the spatial datapoints 19, especially close to objects 17, the spatial datapoints 19 provided by the Lidar system 13 may also be regarded as a Lidar point cloud.

As can be recognized in FIG. 2, the spatial datapoints 19 include a subset 31 of datapoints which belong to a specific object 17, i.e. a passenger car in the example of FIG. 2. For annotating an object 17 based on the Lidar point cloud or the plurality of spatial datapoints 19, a cuboid 33 is assigned to the subset 31 of the spatial datapoints 19. In detail, the subset 31 of the spatial datapoints 19 is tightly enclosed by the cuboid 33 such that almost all datapoints 19 belonging to the subset 31 are located within the cuboid 33. However, the cuboid 33 has to enclose the subset 31 and therefore the object 17 tightly such that the distances between the surfaces of the cuboid 33 and the adjacent datapoints 19 of the subset 31 are minimized. In addition, the annotation of the object 17 includes that the object is classified by identifying the type of the object 17. In the example of FIG. 2, the object 17 is identified or classified as a passenger car.

In summary, annotating an object includes "enclosing" the object 17 by the cuboid 33, i.e. assigning the cuboid to the subset 31 of the spatial datapoints 19 belonging to the respective object 17 by defining the dimensions and the orientation of the cuboid 33, and classifying the object 17, i.e. relating the respective object 17 to one class of a plurality of predefined object classes 41 (see FIG. 4). The dimensions and the orientation of the cuboid 33 include length, width and height as well as roll, pitch and yaw angles of the cuboid 33. The annotation of the objects 17 based on the Lidar point cloud or spatial datapoints 19 is performed manually for the present embodiment. As an alternative, an automatic pattern recognition system may be used for the annotation of the objects 17.

Regardless of manually or automatically annotating the objects 17, the annotation of the objects 17 may be erroneous, especially if a large number of objects 17 has to be annotated. For example, the cuboids 33 may not match properly to the subset 31 of spatial datapoints 19 belonging to the respective object 17. In detail, the dimensions of the cuboid 33 may be selected during the annotation such that only a part of the datapoints 19 is enclosed by the cuboid 33 or, conversely, that the dimensions of the cuboid 33 are too large and do not enclose the object 17 tightly. In addition, the orientation of the cuboid 33 may also not match properly to the actual object 17. Moreover, the object 17 may also be wrongly classified.

Therefore, a review of the annotated objects 17 is usually required before these may be used by further systems of a vehicle, e.g. as a ground truth for machine learning algorithms which may be used by a driver assistance system or in autonomous driving. If the annotations of all objects 17 which are identified based on a Lidar point cloud had to be reviewed manually, this were a very time-consuming and tedious task. In addition, such a manual review process may be error-prone.

Therefore, the present disclosure provides a method and the computer system 11 for automatically validating the annotations of objects 17. First, a portion of the spatial datapoints 19 which are provided by the Lidar system 13 is selected. The selected portion of the datapoints 19 is associated with sample objects via respective subsets 31 of the datapoints 19 which belongs to the selected portion. The sample objects are associated with respective annotation data which is described in detail below. The selected portion of the datapoints 19 and the corresponding sample objects including their annotation data are represented by 20 in FIG. 1 and received by the processing unit 15.

The annotation of sample objects which is performed before the method is executed by the processing unit 15 includes identifying and classifying the sample objects within the selected portion of the spatial datapoints 19 and assigning a respective cuboid 33 (see FIG. 2) to the subset 31 of spatial datapoints 19 belonging to the respective object 17. Therefore, the annotation data of the sample objects includes a classification and spatial information, i.e. regarding size and spatial position, for the cuboid 33 enclosing the respective sample object. The annotation for a portion of the spatial datapoints 19 is performed without reviewing the annotation results. Thereafter, a value of at least one property is determined automatically by the method and the computer system 11 for each sample object based on the respective subset 31 of the spatial datapoints 19 and/or based on the cuboid 33 which is assigned to the respective sample object.

The at least one property includes the dimensions of the respective object 17 or cuboid 33, i.e. length, width and height, and/or one of the angles describing the orientation of the object 17 or the cuboid 33, i.e. roll, pitch and/or yaw angles. In addition, the velocity of the objects 17 may be considered as one of the properties of the respective object 17 if a sequence of Lidar scans is available in order to monitor the timely development of the movement of the respective object 17.

If n properties are considered for validating the annotation, the values of these properties are represented by an n-dimensional vector which is also referred to as a "signature" vector of the sample objects. According to the method, a statistical distribution 35 (see FIGS. 3A and 3B) over all sample objects belonging to a certain object class is generated for each property, i.e. over each of the components of the n-dimensional signature vector.

The method and the computer system 11 according to the disclosure are flexible regarding the number and kind of properties of the objects 17 which are considered for validating the annotation. Since the Lidar system 13 is provided as sensor for the computer system 11, further properties may be considered in addition to the dimensions, the orientation and the velocity of the objects 17. These further properties refer to the relationship of the subset 31 of the spatial datapoints 19 and the respective cuboid 33 (see FIG. 2) which is provided for enclosing the subset 31.

For these additional properties, the spatial datapoints 19 belonging to the respective subset 31 are transformed into a coordinate system which is defined with respect to the individual cuboid 33 belonging to this subset 31. For example, one of the corners of the cuboid 33 is used as origin of such a coordinate system. For each cuboid 33, statistical properties of the spatial datapoints 19 belonging to the respective subset 31 can be derived, e.g. the mean position or center of mass of the datapoints 19 and second order moments (covariant matrix). By this means, the spatial distribution of the datapoints 19 within the cuboid 33 can be described and analyzed. By these additional properties, it can be analyzed e.g. whether the respective cuboid 33 is fitting tightly to the object 17 to be annotated by examining whether most of the datapoints 19 belonging to the subset 31 are "clustered" close to the surfaces of the cuboid 33. Conversely, if the mean of the datapoints 19 is close to the cuboid center, the respective object 17 is most probably annotated wrongly. Furthermore, a wrong classification of an object 17 can be identified based on outliers in the elements of the covariant matrix.

For the example as shown in FIG. 2, a human observer will most probably be able to recognize the outline of a car from the subset 31 of the datapoints 19. Similarly, the method according to the disclosure is able to assess the classification of an object 17 based on the statistical properties of the datapoints 19 within the subset 31 if these are described in the coordinate system defined with respect to the cuboid 33. For example, a tree may be distinguished from a car based on the respective statistical properties of the datapoints within the respective cuboid, e.g. based on the mean values and/or based on the elements of the covariant matrix.

Two examples for statistical distributions 35 related to properties of the objects 17 are shown in FIG. 3A and FIG. 3B. For the object class "passenger car", two properties, i.e. the car length in m (FIG. 3A) and the car width in m (FIG. 3B), have been chosen for validating the annotations. The relative density (being proportional to the relative frequency) over the sample objects is depicted as bars of the respective statistical distribution 35. That is, the respective signature vector has two components, i.e. car length and car width, for this example. For both properties, a respective probability distribution 37 is derived based on the statistical distribution 35. In detail, a Gaussian mixture model is applied to describe the probability distribution. The Gaussian mixture model includes a finite number of Gaussian distributions with unknown parameters which are determined based on the statistical distributions 35.

The Gaussian mixture model is able to provide multimodal probability distributions for which a prominent example is shown in FIG. 3B. In detail, the statistical distribution 35 of the car width has obviously at least two maxima, one at about 1.8 m and another one at about 2.0 m. Hence, using a single Gaussian distribution in order to approximate the statistical distribution 35 would simplify the actual distribution for the respective property too strongly and probably deliver wrong results. Therefore, the Gaussian mixture model including more than one Gaussian distribution provides a better approximation for the actual distributions 35 of car length and car width.

In order to determine cluster centers of the statistical distributions 35 which are to be used as respective mean value or center for one of the Gaussian distributions within the Gaussian mixture model, a k means algorithm is used which is known in the art. In detail, a suitable number of centers and their position as well as the respective covariant matrices are determined by applying a median, i.e. a k-median-algorithm to each statistical distribution 35. The use of the median provides a robust estimate for the centers and the standard deviations of the respective Gaussian distributions within the Gaussian mixture model since the annotations of the sample objects are not reviewed and it is therefore expected that they include outliers within the distributions 35 of their properties.

After estimating the respective probability distributions 37 for each property (e.g. for the car length and for the car width as shown in FIG. 3A and FIG. 3B) via the processing unit 15 (see FIG. 1), all available spatial datapoints 19 provided by the Lidar system 13, i.e. the entire Lidar point cloud, and the corresponding annotation data are received by the processing unit 15. The entirety of the datapoints 19 and the annotation data for all objects 17 are represented by 22 in FIG. 1. The annotation for all datapoints 19 is performed in the same manner as described above for the selected portion of the datapoints 19 associated with the sample objects. That is, objects 17 are identified and classified for all spatial datapoints 19, and a cuboid 33 is assigned to the respective subset 31 of the spatial datapoints 19 for each identified object 17.

After determining the probability distributions 37, the processing unit 15 determines a value of each relevant property for each object. For the example as shown in FIGS. 3A and 3B, the length and the width are determined for all objects 17 within the respective object class 41 (see FIG. 4). From the probability distribution 37 for the respective property, e.g. car length and car width, a respective target range 39 (see FIGS. 3A and 3B) or range 39 of acceptable values is derived. In detail, the range 39 of acceptable values includes such values of the respective property for which the corresponding probability value provided by the respective probability distribution 37 is greater than a predefined threshold.

The probability distributions 37 which have been previously determined for the respective property based on the statistical distribution 35 of the properties for the sample objects are used for determining a probability value to the determined value of the respective property for each object, i.e. for the further objects 17 as well which are different from the sample objects. For example, if a certain length and a certain width are determined for a car, the respective probability value for this length and for this width can be taken directly from the respective probability distribution 37 as shown in FIG. 3A and FIG. 3B.

Based on this probability value which is determined for the respective property value (e.g. to the value for the car length and for the car width as shown in FIGS. 3A and 3B) objects 25 are selected for a review regarding erroneous annotation (see FIGS. 1 and 4). That is, if the respective probability value assigned to one of the properties is smaller than e.g. a predefined threshold, the corresponding object 25 is assumed to have an erroneous annotation and is therefore selected for the review. In a more sophisticated manner, the local outlier factor (LOF) can be used which is a non-parametric, density based algorithm for finding outliers. The local outlier factor has been applied to the distributions 35 as shown in FIGS. 3A and 3B. As a result, objects 17 having a car length or car width in the respective range 39 of acceptable values are assumed to be correctly annotated since their car length and car width represented by the small bars fall into the respective range 39. In contrast, all objects whose car length and car width are in the ranges 40, i.e. outside the range 39 of acceptable values, are identified as outliers by the local outlier factor. The respective property (car length and/or car width) has a low probability value which is assigned by the respective probability distribution 37.

The method provides output information 21 (see FIG. 1) which includes a list 23 of the selected objects 25 for which a review regarding erroneous annotation is assumed to be necessary. Finally, a review of the selected objects 25 is performed at 27.

FIG. 4 depicts the list 23 of objects 25 being selected for the review regarding erroneous annotation in more detail. The list 23 is provided as output information 21 by the processing unit 15 (see FIG. 1).

For each selected object 25, the list 23 includes an object class 41, i.e. whether the object 25 is a car, a pedestrian, a truck etc. The list 23 further provides a unique identification 43 and information 45 regarding the spatial location for each object 25. In the present example, the number of a specific frame is provided in which the object 25 is to be found.

In addition, information regarding a potential annotation error 47 is provided. In detail, it is indicated which property of the respective object 25 is regarded as erroneously annotated. In the present example, the relevant property of the selected objects 25 is the width, the height and the speed for a car, a pedestrian and a truck, respectively. Since the width of the car is regarded as being too small, the height of the pedestrian is regarded as being too large and the speed of the truck is regarded as being too high, the object class 41 of the selected objects 25 is also assumed to be questionable and has to be checked in the final review 27 (see FIG. 1). Although FIGS. 3A and 3B explicitly depict the respective probability distribution 37 for the length and the width of a car only, it will be understood that similar probability distributions 37 can also be derived for the speed and for further properties of the sample objects. For the speed, e.g. a sequence of Lidar scans may be used in order to determine the change of the spatial position of the datapoints 19.

In the final review 27, the selected objects 25 provided by the list 23 have to be checked only regarding their annotations, but not the total number of objects 17 which are identified in the environment of the Lidar system 13 and the host vehicle, respectively. Therefore, the time for reviewing the annotations is strongly reduced in comparison to a manual review of all objects 17. Further, serious annotation errors can be identified more easily and corrected. In comparison to a manual review of all objects 17, it is also less likely that such a serious annotation error will be overlooked. Hence, the quality of the annotation of the identified objects 17 is improved. Moreover, it is clearly indicated by the potential annotation error 47 for each selected object 25 which property of the object 25 is regarded as erroneous due to the annotation. This will also help to identify and to correct the respective annotation error. Due to the indication of the potential annotation error 47, the time for correcting this error is further reduced and the quality of the final annotation result is therefore additionally improved.

REFERENCE NUMERAL LIST

11 computer system
13 sensor, Lidar system
14 line
15 processing unit
17 object
19 spatial datapoints
20 selected datapoints and sample objects
21 output information
22 data points and annotation data of all objects
23 list of selected objects to be reviewed
25 erroneous or selected object
27 final review
31 subset of datapoints
33 cuboid
35 statistical distribution of a property of the objects
37 probability distribution
39 target range or range of acceptable values
40 range of outliers
41 object class
43 unique object identification
45 information regarding spatial location
47 potential annotation error

The invention claimed is:
1. A computer implemented method for validating annotations of objects, the method comprising:

receiving a plurality of spatial datapoints acquired by a sensor, wherein the spatial datapoints are related to an external environment of the sensor, receiving annotation data of objects associated with the acquired spatial datapoints, the annotation data including an identification of each respective object, and validating, via a processing unit, the annotations of the objects by performing the steps of:

determining a target range for at least one property of the objects, determining, from the acquired spatial datapoints and/or from the annotation data, a respective value of the at least one property for each respective object, and for each object, identifying the object as an erroneous object if the respective value of the at least one property is outside the target range for the at least one property, the erroneous object being selected for review regarding erroneous annotation;

wherein:

the identification of each respective object includes a classification and a predefined geometrical shape, the predefined geometrical shape being associated with a subset of the acquired spatial datapoints for each respective object;

the target range is determined by performing the steps of:

selecting a portion of the spatial datapoints which include a respective subset of the spatial datapoints for each of a plurality of sample objects, determining a respective value of the at least one property for each sample object based on the predefined geometrical shape and/or the respective subset of the spatial datapoints, estimating at least one probability distribution for the property based on a statistical distribution for the values of the property for the sample objects, deriving the target range for the at least one property of the respective objects from the at least one probability distribution;

a probability value is determined for the value of the at least one property based on at least one probability distribution, the respective value of the at least one property is outside the target range if the probability value is smaller than a predetermined threshold;

a percentage share of a total number of objects is predefined for the review regarding erroneous annotation; and one respective object having a lowest probability value is iteratively selected for the review until the number of selected objects is equal to the predefined percentage share of the total number of objects.

2. The method according to claim 1, wherein the predefined geometrical shape is a cuboid.

3. The method according to claim 1, wherein the classification of the respective object comprises that the respective object is associated with one of a plurality of object classes, and estimating the at least one probability distribution for the at least one property comprises estimating a separate probability distribution for each of the plurality of object classes.

4. The method according to claim 3, wherein each probability distribution is based on a Gaussian mixture model.

5. The method according to claim 4, wherein the Gaussian mixture model includes a plurality of Gaussians distributions, and for each Gaussian distribution:

a center is determined based on a median of the determined values of the at least one property for the respective object class, and a standard deviation is determined based on a median of an absolute deviation for the determined values of the at least one property for the respective object class.

6. The method according to claim 4, wherein:

the Gaussian mixture model includes a plurality of Gaussians distributions; and for each Gaussian distribution:

a center is determined based on a median of the determined values of the at least one property for the respective object class, and a standard deviation is determined based on a median of an absolute deviation for the determined values of the at least one property for the respective object class.

7. The method according to claim 1, wherein the at least one property is derived from a spatial distribution of the datapoints of the respective subset with respect to the predefined geometrical shape.

8. The method according to claim 1, wherein the at least one property includes at least one statistical property of the datapoints of the respective subset.

9. The method according to claim 1, wherein the at least one property of the objects includes parameters of a spatial location of the objects.

10. The method according to claim 1, wherein the plurality of spatial datapoints is based on a sequence of Lidar scans for a predetermined time period, and the at least one property includes a respective velocity of the objects with respect to the sensor, wherein the respective velocity is determined based on the sequence of Lidar scans.

11. The method according to claim 1, wherein for each object being selected for the review regarding erroneous annotation, a potential annotation error is indicated.

12. A computer system, configured to carry out the computer implemented method of claim 1.

13. A non-transitory computer readable medium comprising instructions for carrying out the computer implemented method of claim 1.

14. A computer implemented method for validating annotations of objects, the method comprising:

receiving a plurality of spatial datapoints acquired by a sensor, wherein the spatial datapoints are related to an external environment of the sensor, receiving annotation data of objects associated with the acquired spatial datapoints, the annotation data including an identification of each respective object, and validating, via a processing unit, the annotations of the objects by performing the steps of:

determining a target range for at least one property of the objects, determining, from the acquired spatial datapoints and/or from the annotation data, a respective value of the at least one property for each respective object, and for each object, identifying the object as an erroneous object if the respective value of the at least one property is outside the target range for the at least one property, the erroneous object being selected for review regarding erroneous annotation;

wherein:

the identification of each respective object includes a classification and a predefined geometrical shape, the predefined geometrical shape being associated with a subset of the acquired spatial datapoints for each respective object;

the target range is determined by performing the steps of:

selecting a portion of the spatial datapoints which include a respective subset of the spatial datapoints for each of a plurality of sample objects, determining a respective value of the at least one property for each sample object based on the predefined geometrical shape and/or the respective subset of the spatial datapoints, estimating at least one probability distribution for the property based on a statistical distribution for the values of the property for the sample objects, and deriving the target range for the at least one property of the respective objects from the at least one probability distribution;

the classification of the respective object comprises that the respective object is associated with one of a plurality of object classes; and estimating the at least one probability distribution for the at least one property comprises estimating a separate probability distribution for each of the plurality of object classes.

15. The method according to claim 14, wherein each probability distribution is based on a Gaussian mixture model.

* * * * *